US009242426B2

(12) United States Patent
Wu et al.

(10) Patent No.: US 9,242,426 B2
(45) Date of Patent: Jan. 26, 2016

(54) COMPOSITE PLATE STRUCTURE AND MANUFACTURING METHOD THEREOF

(71) Applicants: Jung-Chin Wu, Taipei (TW); Po-An Lin, Taipei (TW); Han-Ching Huang, Taipei (TW); Chih-Wen Chiang, Taipei (TW); Yen-Ling Liu, Taipei (TW)

(72) Inventors: Jung-Chin Wu, Taipei (TW); Po-An Lin, Taipei (TW); Han-Ching Huang, Taipei (TW); Chih-Wen Chiang, Taipei (TW); Yen-Ling Liu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 69 days.

(21) Appl. No.: 13/654,431

(22) Filed: Oct. 18, 2012

(65) Prior Publication Data

US 2013/0108830 A1  May 2, 2013

Related U.S. Application Data

(60) Provisional application No. 61/551,464, filed on Oct. 26, 2011.

(51) Int. Cl.
| | |
|---|---|
| *B32B 3/24* | (2006.01) |
| *B32B 3/30* | (2006.01) |
| *H05K 5/02* | (2006.01) |
| *B32B 3/26* | (2006.01) |
| *B32B 37/12* | (2006.01) |
| *B32B 5/14* | (2006.01) |

(52) U.S. Cl.
CPC ............... *B32B 3/266* (2013.01); *B32B 5/142* (2013.01); *B32B 37/1207* (2013.01); *H05K 5/02* (2013.01); *B32B 2457/00* (2013.01); *Y10T 428/24331* (2015.01)

(58) Field of Classification Search
CPC .................... B29C 70/088; H04M 1/0283
See application file for complete search history.

(56) References Cited

U.S. PATENT DOCUMENTS

| | | | | | |
|---|---|---|---|---|---|
| 4,587,175 | A | * | 5/1986 | Akao | B32B 3/266 428/134 |
| 4,954,387 | A | * | 9/1990 | Sikorski | B29C 37/0085 428/138 |
| 2005/0048260 | A1 | * | 3/2005 | Modin | B29C 70/545 428/138 |
| 2006/0159887 | A1 | * | 7/2006 | Rajabali | B29C 70/885 428/138 |
| 2009/0047471 | A1 | * | 2/2009 | Kellenberger | B29C 70/12 428/138 |
| 2009/0110853 | A1 | * | 4/2009 | Chiang | 428/34.7 |

(Continued)

FOREIGN PATENT DOCUMENTS

| | | | | |
|---|---|---|---|---|
| DE | 102007038926 | | 2/2009 | |
| GB | 2290045 | A * | 12/1995 | ............. B29C 70/46 |

(Continued)

OTHER PUBLICATIONS

Machine Translation of JP 08264169 A, Oct. 1996.*

(Continued)

*Primary Examiner* — Jeff Vonch
(74) *Attorney, Agent, or Firm* — Jianq Chyun IP Office

(57) ABSTRACT

A composite plate structure including a fiber composite sheet, a metal layer, and a resin layer is provided. The fiber composite sheet includes a first fiber layer, a core layer, and a second fiber layer. The core layer is disposed between the first fiber layer and the second fiber layer. The metal layer is disposed on the fiber composite sheet and has at least one opening. A portion of the second fiber layer is located in the opening. The resin layer is disposed on the metal layer. In addition, a manufacturing method of the composite plate structure is also provided.

8 Claims, 6 Drawing Sheets

(56) References Cited

U.S. PATENT DOCUMENTS

| | | | |
|---|---|---|---|
| 2009/0110872 A1* | 4/2009 | DiFonzo et al. | 428/113 |
| 2009/0267266 A1* | 10/2009 | Lee | G06F 1/1616 264/272.11 |
| 2009/0324908 A1* | 12/2009 | Hsu | B44C 3/10 428/205 |
| 2010/0143648 A1* | 6/2010 | Tsai | B29C 45/14311 428/138 |
| 2010/0143650 A1* | 6/2010 | Tsai | B29C 66/304 428/139 |
| 2010/0175976 A1* | 7/2010 | Chen | H01H 13/83 200/5 A |
| 2010/0183848 A1* | 7/2010 | Krause | 428/167 |
| 2011/0070431 A1 | 3/2011 | Noordegraaf et al. | |
| 2011/0223382 A1* | 9/2011 | Gu et al. | 428/136 |
| 2011/0290685 A1* | 12/2011 | Kenney | 206/320 |
| 2012/0164360 A1* | 6/2012 | Wu | B29C 45/14311 428/35.6 |
| 2012/0321840 A1* | 12/2012 | Wu | G06F 1/1633 428/116 |

FOREIGN PATENT DOCUMENTS

| | | | | |
|---|---|---|---|---|
| JP | 63102921 A | * | 5/1988 | |
| JP | 05208471 A | * | 8/1993 | |
| JP | 08264169 A | * | 10/1996 | H01M 2/10 |
| JP | 2001315162 A | * | 11/2001 | B29C 45/14 |
| JP | 2007040046 A | * | 2/2007 | |
| TW | 201129277 | | 8/2011 | |

OTHER PUBLICATIONS

Machine Translation of JP 2001315162 A, Nov. 2001.*
"Office Action of German Counterpart Application" with English translation, issued on Jun. 20, 2013, p. 1-p. 7.

* cited by examiner

COMPOSITE PLATE STRUCTURE AND MANUFACTURING METHOD THEREOF

CROSS-REFERENCE TO RELATED APPLICATION

This application claims the priority benefits of U.S. provisional application Ser. No. 61/551,464, filed on Oct. 26, 2011. The entirety of the above-mentioned patent application is hereby incorporated by reference herein and made a part of this specification.

BACKGROUND OF THE INVENTION

1. Field of the Invention

The invention relates to a composite plate structure and a manufacturing method thereof and particularly relates to a composite plate structure having a metal layer and a manufacturing method thereof

2. Description of Related Art

In recent years, portable electronic devices have been developed to provide more functions and have smaller sizes. Wireless communication and wireless network make it convenient for people to acquire information from the Internet via portable electronic devices, and as a result, portable electronic devices become common. In order to increase portability, portable electronic devices are made to be thinner and lighter. Composite materials composed of materials, such as mylar, graphite, bamboo fiber, or carbon fiber, are lighter and thus are used to manufacture the housing of portable electronic devices.

Portable electronic devices usually store a lot of data and applications. It will be inconvenient to carry the portable electronic devices if they do not have sufficient structural strength against shake or pressure. Thus, how to increase the structural strength of composite materials is an important issue in designing the housing for portable electronic devices. In addition, electronic devices are developed to have more exquisite appearance. Composite materials not only need to be strong in structure and light in weight but also need to be visually attractive to the consumers.

SUMMARY OF THE INVENTION

The invention provides a composite plate structure having higher strength against bending and deformation and better appearance.

The invention provides a manufacturing method for manufacturing a composite plate structure having higher strength against bending and deformation and better appearance.

The invention provides a composite plate structure including a fiber composite sheet, a metal layer, and a resin layer. The fiber composite sheet includes a first fiber layer, a core layer, and a second fiber layer. The core layer is disposed between the first fiber layer and the second fiber layer. The metal layer is disposed on the fiber composite sheet and has at least one opening. A portion of the second fiber layer is located in the opening. The resin layer is disposed on the metal layer.

In an embodiment of the invention, a portion of the resin layer is located in the opening.

In an embodiment of the invention, the portion of the second fiber layer completely fills the opening and is coplanar with the metal layer.

In an embodiment of the invention, a portion of the resin layer is located between the metal layer and the second fiber layer.

In an embodiment of the invention, a portion of the resin layer covers the metal layer.

In an embodiment of the invention, an aperture ratio of the metal layer is in a range of 20% to 80%.

In an embodiment of the invention, the first fiber layer is a carbon fiber layer or a glass fiber layer.

In an embodiment of the invention, the second fiber layer is a carbon fiber layer or a glass fiber layer.

The invention provides a manufacturing method of a composite plate structure. First, a fiber composite sheet is provided, which includes a first fiber layer, a core layer, and a second fiber layer, wherein the core layer is disposed between the first fiber layer and the second fiber layer. Next, a metal layer is provided, wherein the metal layer includes at least one opening. A resin layer is coated onto the fiber composite sheet. A thermal bonding process is performed to bond the metal layer to the resin layer and the fiber composite sheet.

In an embodiment of the invention, the step of bonding the metal layer to the resin layer and the fiber composite sheet includes: disposing a portion of the resin layer into the opening.

In an embodiment of the invention, the step of bonding the metal layer to the resin layer and the fiber composite sheet includes: moving a portion of the resin layer from a side of the metal layer to another side of the metal layer via the opening.

In an embodiment of the invention, the step of bonding the metal layer to the resin layer and the fiber composite sheet includes: disposing a portion of the second fiber layer into the opening.

In an embodiment of the invention, the step of filling the portion of the second fiber layer into the opening includes: completely filling the opening with the portion of the second fiber layer such that the portion of the second fiber layer is coplanar with the metal layer.

The invention provides a manufacturing method of a composite plate structure. First, a first fiber layer, a core layer, a second fiber layer, and a metal layer, which are arranged in an order, are provided, wherein the metal layer includes at least one opening. Next, a resin layer is coated onto the second fiber layer. A thermal bonding process is performed to bond the first fiber layer, the core layer, the second fiber layer, and the metal layer.

Based on the above, the invention combines the metal layer with the fiber composite sheet to enhance structural strength, such that the composite plate structure has higher strength against bending and deformation. Moreover, the formation of the openings in the metal layer reduces the weight of the composite plate structure. The openings may also have different shapes to expose the fiber layer of the composite plate structure and form a decorative pattern, such that the composite plate structure has a better appearance.

To make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
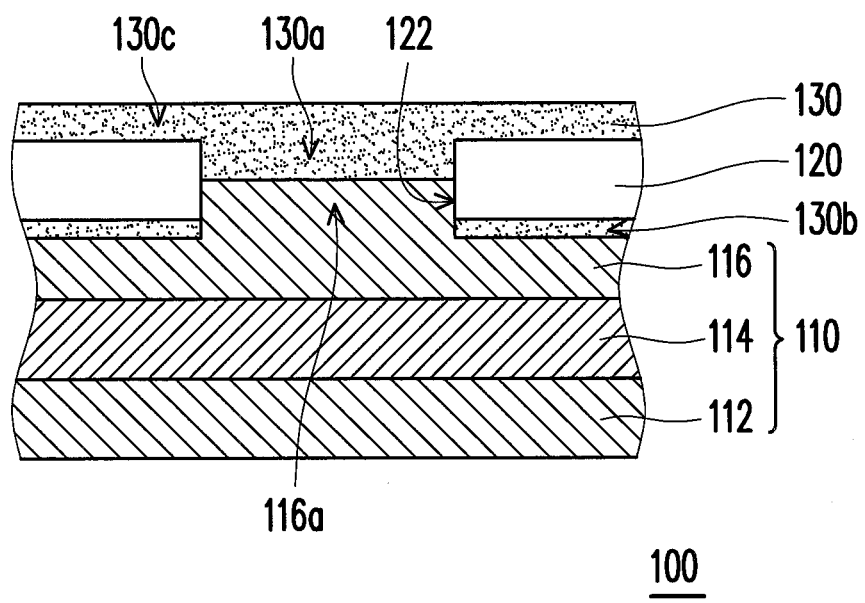
FIG. 1 is a schematic view of a composite plate structure according to an embodiment of the invention.

FIG. 1 is a schematic view of a composite plate structure according to an embodiment of the invention. Referring to FIG. 1, a composite plate structure 100 according to this embodiment includes a fiber composite sheet 110, a metal layer 120, and a resin layer 130. The fiber composite sheet 110 includes a first fiber layer 112, a core layer 114, and a second fiber layer 116, wherein the core layer 114 is disposed between the first fiber layer 112 and the second fiber layer 116. The metal layer 120 is disposed on the second fiber layer 116 of the fiber composite sheet 110 and has at least one opening 122. A portion 116a of the second fiber layer 116 is located in the opening 122. The resin layer 130 is disposed on the metal layer 120, wherein a portion 130a of the resin layer 130 is located in the opening 122, a portion 130b of the resin layer 130 is located between the metal layer 120 and the second fiber layer 116, and a portion 130c of the resin layer 130 covers the metal layer 120.

When the aforementioned metal layer 120 is combined with the fiber composite sheet 110 as described above, the structural strength is enhanced, such that the composite plate structure 100 has higher strength against bending and deformation under an external force. In addition, the opening 122 is formed in the metal layer 120 to reduce the weight of the composite plate structure 100. An aperture ratio of the metal layer 120 is for example between 20% and 80%, but the invention is not limited thereto. The aperture ratio of the metal layer 120 may be varied as required.

The composite plate structure 100 of this embodiment is for example a housing adapted for a portable electronic device. In other embodiments, the composite plate structure 100 can also be applied to other types of devices. The above disclosure of the invention should not be construed as a limitation to the application of the composite plate structure 100.

Figure 2A:
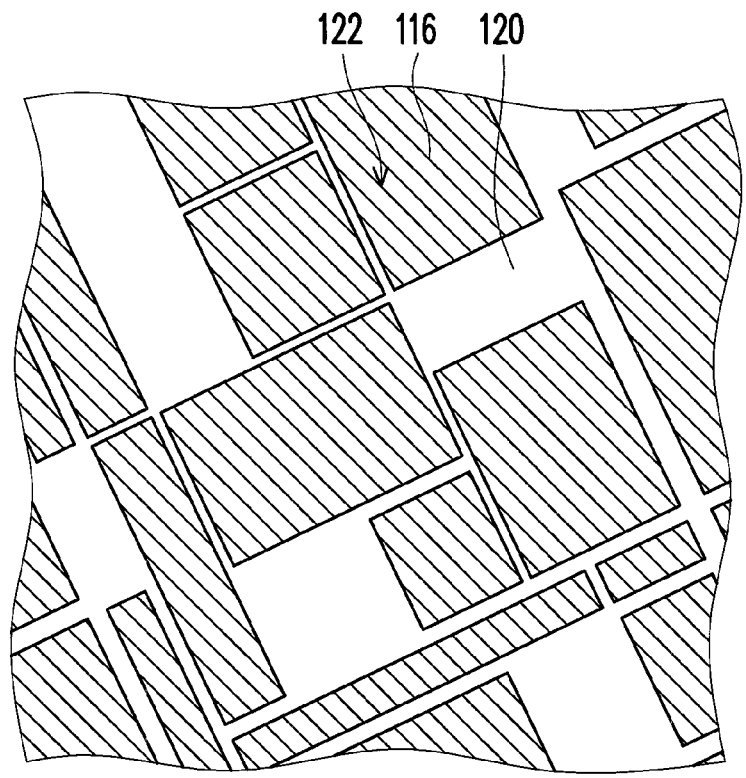
FIG. 2A is a schematic top view of the composite plate structure of FIG. 1.

FIG. 2A is a schematic top view of the composite plate structure of FIG. 1. The resin layer 130 as shown in FIG. 1 is a transparent structure, for example. Therefore, the user may see the metal layer 120 and the second fiber layer 116 covered by the resin layer 130 (not depicted in FIG. 2A) as shown in FIG. 2A. The formation of the openings 122 in the metal layer 120 reduces the weight of the composite plate structure 100. Furthermore, the openings 122 may have different shapes to expose the second fiber layer 116 and form a decorative pattern, as shown in FIG. 2A, such that the composite plate structure 100 has a better appearance. In this embodiment, the first fiber layer 112 and the second fiber layer 116 are for example carbon fiber layers, glass fiber layers, or other suitable fiber layers, but the invention is not restricted to the foregoing. In the case that the second fiber layer 116 is a glass fiber layer, since the glass fiber layer is transparent, the user is able to see a pattern of the core layer 114 covered by the second fiber layer 116. Accordingly, the composite plate structure 100 provides a visual effect.

Figure 2B:
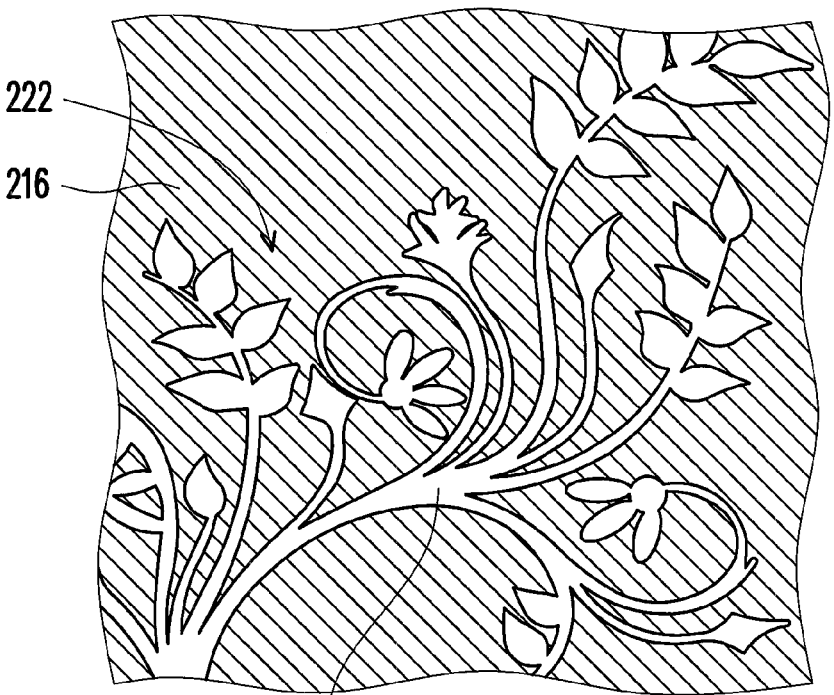
FIG. 2B is a schematic top view of a composite plate structure according to another embodiment of the invention.

FIG. 2A illustrates a plurality of the openings 122 which are rectangular. However, the invention is not limited thereto. In other embodiments of the invention, the number of the openings 122 may vary, and the openings 122 may be in other suitable shapes. The invention is further explained below with reference to FIG. 2B. FIG. 2B is a schematic top view of a composite plate structure according to another embodiment of the invention. Referring to FIG. 2B, the number and the shapes of openings 222 in a metal layer 220 of a composite plate structure 200 of this embodiment are different from the number and the shapes of the openings 122 of FIG. 2A. The openings 222 expose the second fiber layer 216 to form a pattern different from the pattern of FIG. 2A and generate a different visual effect.

Figure 3:
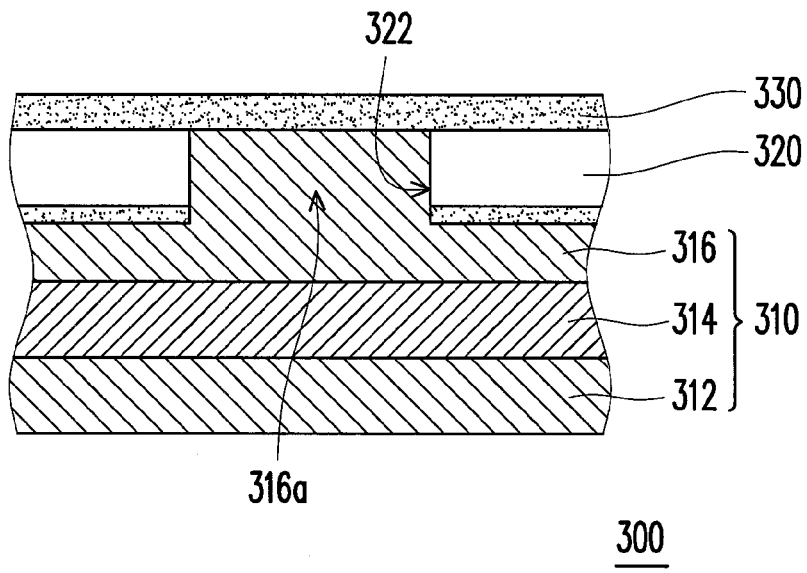
FIG. 3 is a schematic view of a composite plate structure according to another embodiment of the invention.

FIG. 3 is a schematic view of a composite plate structure according to another embodiment of the invention. The configuration of a fiber composite sheet 310, a first fiber layer 312, a core layer 314, a second fiber layer 316, a metal layer 320, and a resin layer 330 in a composite plate structure 300 of this embodiment is similar to the configuration of the fiber composite sheet 110, the first fiber layer 112, the core layer 114, the second fiber layer 116, the metal layer 120, and the resin layer 130 illustrated in FIG. 1. A difference between the composite plate structure 300 and the composite plate structure 100 is that: in FIG. 1, the portion 116a of the second fiber layer 116 only fills a part of the opening 122 and has a height difference with respect to the metal layer 120; however, in FIG. 3, a portion 316a of the second fiber layer 316 completely fills an opening 322 and is coplanar with the metal layer 320.

Figure 4:
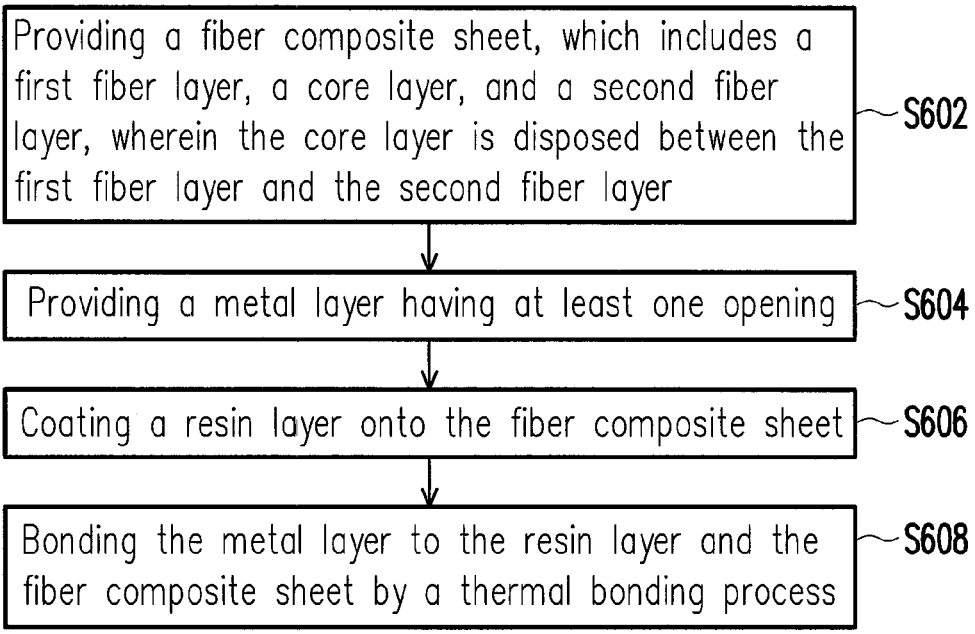
FIG. 4 is a flowchart illustrating a manufacturing method of the composite plate structure of FIG. 1.
Figure 5A:
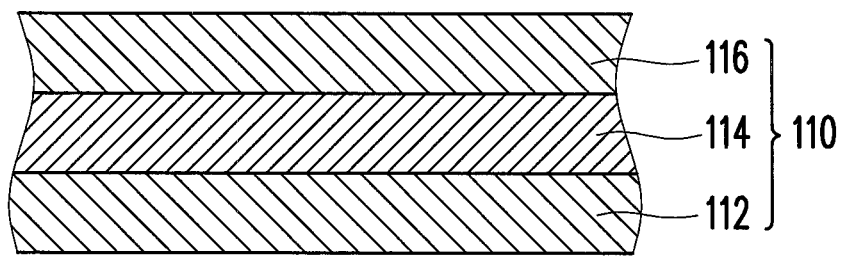
FIGS. 5A to 5C illustrate steps of manufacturing the composite plate structure of FIG. 1.
Figure 5B:
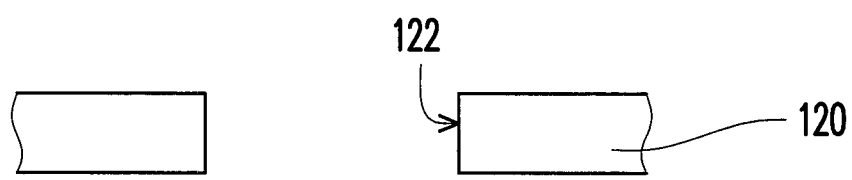
Figure 5B:
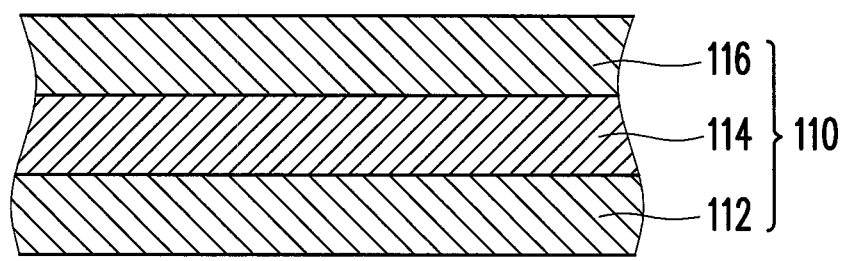
Figure 5C:
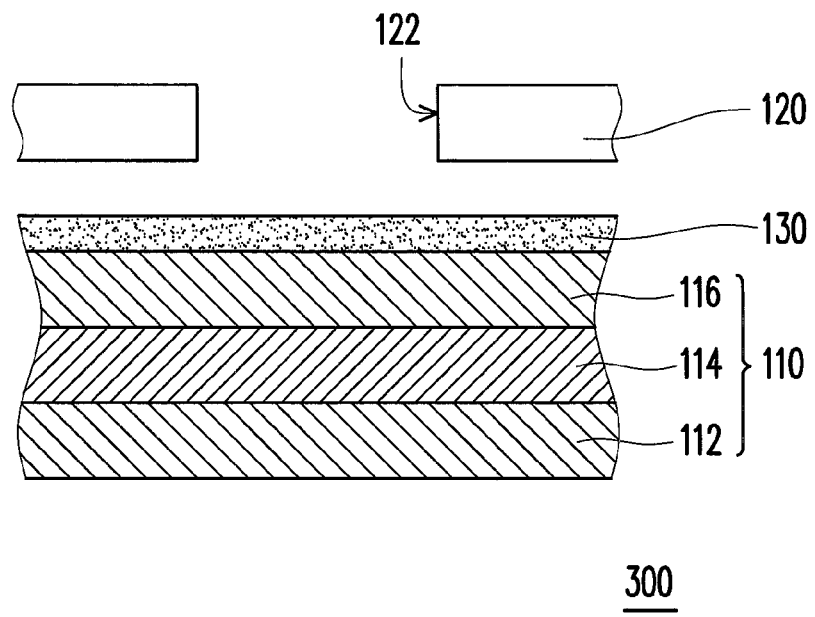

A manufacturing method of a composite plate structure is described below by taking the composite plate structure 100 of FIG. 1 as an example. FIG. 4 is a flowchart illustrating a manufacturing method of the composite plate structure of FIG. 1. FIGS. 5A to 5C illustrate steps of manufacturing the composite plate structure of FIG. 1. With reference to FIG. 4 and FIG. 5A, the fiber composite sheet 110 is provided first, and the fiber composite sheet 110 includes the first fiber layer 112, the core layer 114, and the second fiber layer 116, wherein the core layer 114 is disposed between the first fiber layer 112 and the second fiber layer 116 (Step S602). Referring to FIG. 4 and FIG. 5B, next, the metal layer 120 is provided, wherein the metal layer 120 includes at least one opening 122 (Step S604). Referring to FIG. 4 and FIG. 5C, the resin layer 130 is coated onto the fiber composite sheet 110 (Step S606). Then, a thermal bonding process is performed to bond the metal layer 120 to the resin layer 130 and the fiber composite sheet 110 (Step S608), so as to form the composite plate structure 100 as shown in FIG. 1.

In this embodiment, the resin layer 130 is for example a layer of thermosetting resin. When thermal bonding is performed to form the composite plate structure 100 of FIG. 1, the resin layer 130 is cured by heat. After the thermal bonding process, as shown in FIG. 1, the portion 130a of the resin layer 130 enters the opening 122 of the metal layer 120, the portion 130c of the resin layer 130 moves from a side of the metal layer 120 to another side of the metal layer 120 via the opening 122 and covers the metal layer 120, the portion 130b of the resin layer 130 is located between the second fiber layer 116 and the metal layer 120, and the portion 116a of the second fiber layer 116 enters the opening 122. In other embodiments, when the thermal bonding process is performed, a portion of the second fiber layer may completely fill the opening to be coplanar with the metal layer, so as to form the composite plate structure 300 illustrated in FIG. 3.

According to the manufacturing method shown in FIG. 4 and FIG. 5A to FIG. 5C, the fiber composite sheet 110 formed by bonding the first fiber layer 112, the core layer 114, and the second fiber layer 116 is provided first, and then the metal layer 120 is bonded to the fiber composite sheet 110. However, the invention is not limited to the above. The first fiber layer 112, the core layer 114, and the second fiber layer 116 may not be bonded in advance, and the composite plate structure 100 may be manufactured by bonding the first fiber layer 112, the core layer 114, the second fiber layer 116, and the metal layer 120 at the same time. Detailed explanations are given below.

Figure 6:
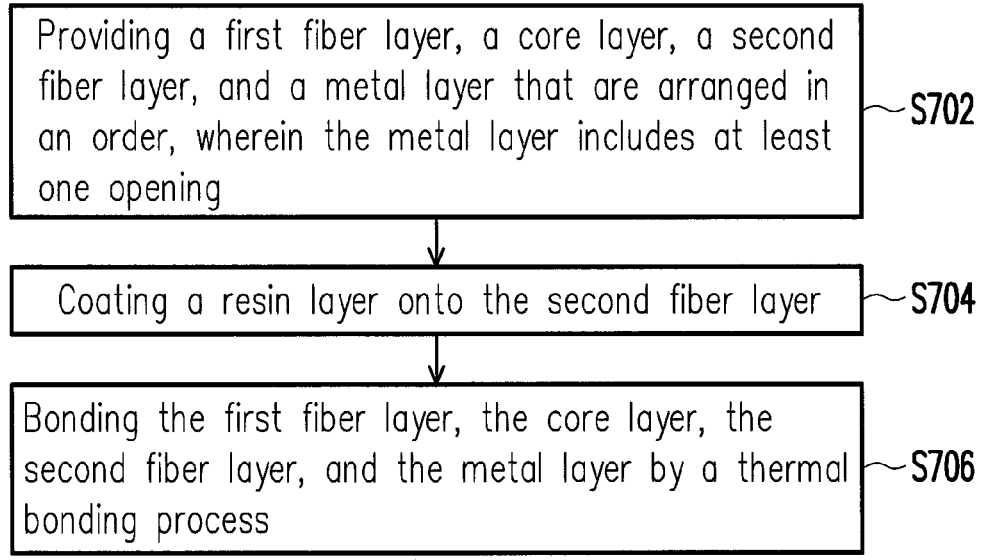
FIG. 6 is a flowchart illustrating a manufacturing method of the composite plate structure of FIG. 1.
Figure 7A:
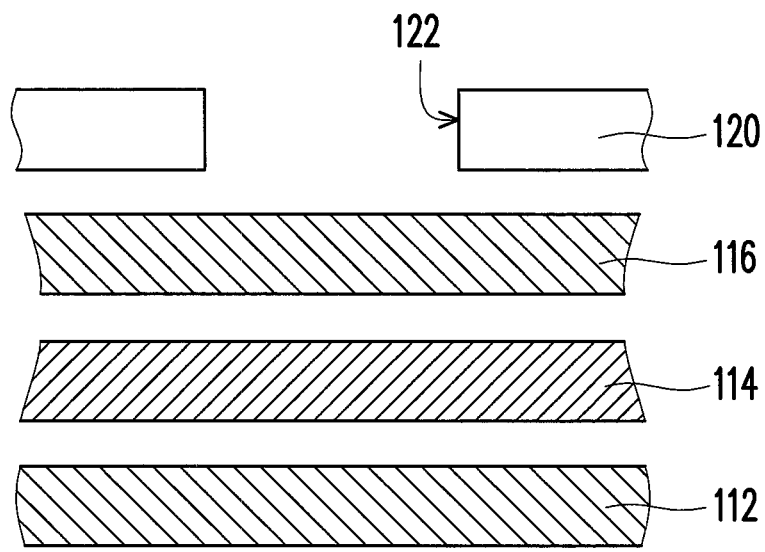
FIGS. 7A to 7B illustrate steps of manufacturing the composite plate structure of FIG. 1.
Figure 7B:
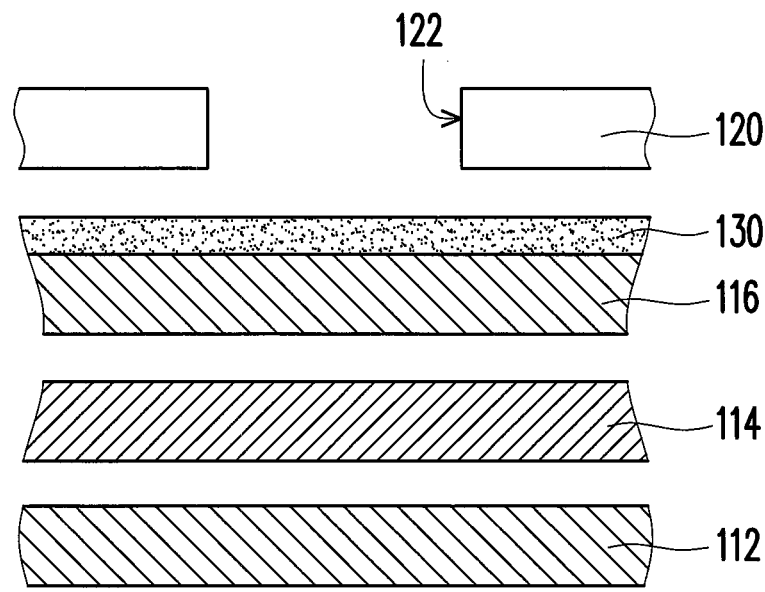

FIG. 6 is a flowchart illustrating a manufacturing method of the composite plate structure of FIG. 1. FIGS. 7A to 7B illustrate steps of manufacturing the composite plate structure of FIG. 1. With reference to FIG. 6 and FIG. 7A, first, a first fiber layer 112, a core layer 114, a second fiber layer 116, and a metal layer 120, which are arranged in an order, are provided, wherein the metal layer 120 includes at least one opening 122 (Step S702). Referring to FIG. 6 and FIG. 7B, next, a resin layer 130 is coated onto the second fiber layer 116 (Step S704). Then, a thermal bonding process is performed to bond the first fiber layer 112, the core layer 114, the second fiber layer 116, and the metal layer 120 (Step S706), so as to form the composite plate structure 100 as shown in FIG. 1.

In conclusion of the above, the invention combines the metal layer with the fiber composite sheet to enhance structural strength, such that the composite plate structure has higher strength against bending and deformation. Moreover, the formation of the openings in the metal layer reduces the weight of the composite plate structure. The openings may also have different shapes to expose the fiber layer of the composite plate structure and form a decorative pattern, such that the composite plate structure has a better appearance.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A composite plate structure, comprising:
   a fiber composite sheet comprising a first fiber layer, a core layer, and a second fiber layer, wherein the core layer is disposed between the first fiber layer and the second fiber layer;
   a metal layer disposed on the fiber composite sheet and comprising at least one opening, wherein a portion of the second fiber layer is located in the opening; and
   a resin layer disposed on the metal layer, wherein the resin layer is partially located at a first side of the metal layer to cover the opening and partially located at a second side of the metal layer to surround the portion of the second fiber layer extending into the opening, and the first side and the second side are opposite to each other.

2. The composite plate structure according to claim 1, wherein a portion of the resin layer is located in the opening.

3. The composite plate structure according to claim 1, wherein the portion of the second fiber layer completely fills the opening and is coplanar with the metal layer.

4. The composite plate structure according to claim 1, wherein a portion of the resin layer is located between the metal layer and the second fiber layer.

5. The composite plate structure according to claim 1, wherein the resin layer covers the metal layer.

6. The composite plate structure according to claim 1, wherein an aperture ratio of the metal layer is in a range of 20% to 80%.

7. The composite plate structure according to claim 1, wherein the first fiber layer is a carbon fiber layer or a glass fiber layer.

8. The composite plate structure according to claim 1, wherein the second fiber layer is a carbon fiber layer or a glass fiber layer.

* * * * *